United States Patent [19]
Tsuboike et al.

[11] Patent Number: 6,023,604
[45] Date of Patent: Feb. 8, 2000

[54] TRANSMISSION CONTROL APPARATUS AND METHOD OF EARTH STATION FOR SATELLITE COMMUNICATION

[75] Inventors: Mitsuyoshi Tsuboike, Kanagawa; Osamu Fuse, Tokyo; Kiyotaka Nakajima, Tokyo; Nobuhiro Shioda, Tokyo, all of Japan

[73] Assignees: NEC Corporation; Tokyo Broadcasting System, both of Japan

[21] Appl. No.: 08/747,039

[22] Filed: Nov. 8, 1996

[30] Foreign Application Priority Data

Nov. 9, 1995 [JP] Japan ................................ 7-290708

[51] Int. Cl.[7] .................................................. H04B 7/185
[52] U.S. Cl. ........................ 455/12.1; 455/13.1; 370/445
[58] Field of Search ............................... 455/12.1, 15, 16, 455/17, 19, 427, 450, 455, 507, 515, 517; 370/296, 445, 447

[56] References Cited

U.S. PATENT DOCUMENTS

| | | | |
|---|---|---|---|
| 4,273,962 | 6/1981 | Wolfe | 455/12.1 |
| 4,594,706 | 6/1986 | Kobayashi | 370/445 |
| 4,736,371 | 4/1988 | Tejima et al. | 370/445 |
| 5,079,766 | 1/1992 | Richard et al. | 370/445 |

OTHER PUBLICATIONS

Spragins et al. "Telecommucations Protocols & Design" pages 226–229, Addision–Wesley Publishing Co, 7/1992.

Primary Examiner—Thanh Cong Le
Attorney, Agent, or Firm—Ostrolenk, Faber, Gerb & Soffen, LLP

[57] ABSTRACT

In a satellite communication system in which a satellite repeater and a transmission channel are shared between a plurality of earth stations for satellite communication, each of the earth stations stops the initiation of the transmission of the transmission signal upon detection of a reception signal via a reception channel corresponding to a transmission channel of the station. On the other hand, if the reception signal is detected during the transmission of the transmission signal, the earth station continues the transmission of the transmission signal until a predetermined transmission of the transmission signal is completed.

5 Claims, 3 Drawing Sheets

TRANSMISSION CONTROL APPARATUS AND METHOD OF EARTH STATION FOR SATELLITE COMMUNICATION

BACKGROUND OF THE INVENTION

The present invention relates to a transmission control apparatus and method of an earth station for satellite communication in a satellite communication system including a plurality of earth stations on the earth to conduct communications through a transmission channel shared therebetween and the earth stations conduct communications with each other via a satellite repeater, and in particular, to a transmission control method of a earth station for satellite communication suitable for a satellite news gathering (SNG) system in which materials of broadcast video news are transmitted via the satellite communication.

DESCRIPTION OF THE RELATED ART

Description will now be given of a conventional satellite communication system of this kind by referring to a system configuration diagram of a satellite communication system shown in FIG. 1 in accordance with the present invention.

The satellite communication system includes a communication satellite 101 serving as a satellite repeater, satellite communication links 107, and such earth stations for satellite communications for achieving communications therebetween via the satellite 101 through the communication links 107 as a video base station 102 serving as a communication control center, an vehicle station 103, a transportable or portable station 104, a video base station 105 functioning as a local base station, and a reception dedicated station 106. In this regard, there are generally arranged a plurality of vehicle stations 103, portable stations 104, video base stations 105, and reception dedicated stations 106. The vehicle stations 103 and portable stations 104 are mobile stations. In the SNG system, the video base station 102 collects video materials from these mobile stations and video base station 105. The communication channels of the satellite communication links 107 includes up-link (transmission) channels of a 14-gigaherz (GHz) band, down-link (reception) channels of a 12-GHz band, a plurality of television (TV) channels for TV video and voice transmission, and at least one order-wire (OW) channel for order-wire communication. The TV and OW channels are shared between the respective earth stations on the earth for satellite communications. However, the station 106 is exclusively used for signal reception and hence does not utilize any transmission channel.

In the satellite communication system of FIG. 1, a transmission channel is commonly employed between the plural earth stations for satellite communications. Consequently, it is necessary to avoid a radio interference in communications conducted by the earth stations via the same transmission channel at the same time. To prevent the interference, there has been known a method in which the transmission channel is confirmed mutually by the transmitting and receiving earth stations via the order-wire channel. Moreover, in the mobile communication system, there has been broadly adopted a demand assignment multiple access (DAMA) in which a central control station (substantially corresponding to the video base station 102 in FIG. 1) assigns the transmission channel via a control channel shared between the respective stations as described, for example, in the Japanese Patent Laid-Open Publication No. 62-38037.

In the former method above, although the apparatus and method are relatively simple, there exists a drawback that a human operation error cannot be easily prevented in the transmission control operation.

Furthermore, the latter is attended with a disadvantage that the system configuration is complicated and the size thereof is increased, and hence the installation cost is soared.

SUMMARY OF THE INVENTION

It is therefore an object of the present invention to avoid the drawbacks above.

In order to achieve the object, there is provided a transmission control apparatus of a earth station for satellite communication in a satellite communication system comprising a plurality of earth stations for satellite communication, a transmission channel shared between the plural earth stations, and a satellite repeater in which transmission signals are communicated between the respective earth stations via the satellite repeater. Each of the earth stations includes transmission control means for stopping, at detection of a reception signal via a reception channel corresponding to a transmission channel of the own station prior to transmission of the transmission signal from the own station, the transmission of the transmission signal and continuing the transmission of the transmission signal, even when the reception signal is detected during the transmission of the transmission signal from the own station, until a predetermined transmission of the transmission signal is completed.

In the transmission control apparatus, the transmission control means may include a reception signal sense circuit for sensing the reception signal via the reception channel and producing a reception sense signal in response thereto, a transmission controller for transmitting, if the reception sense signal has not been received before a transmission ON control signal indicating transmission of the transmission signal from the own station is received, a transmission ON signal indicating transmission of the transmission signal and continuing the transmission of the transmission ON signal until a transmission OFF control signal is received, and a transmission signal ON/OFF circuit for activating the transmission of the transmission signal only when the transmission ON signal is being received.

In accordance with one aspect of the transmission control apparatus, the transmission ON/OFF circuit may include an amplifier at a final stage thereof for amplifying the transmission signal, the amplifier being supplied with power only when the transmission ON signal is being received.

According to another aspect of the transmission control apparatus, the transmission control means may further include transmission channel control means for receiving a transmission channel data signal and thereby controlling the transmission channel of the transmission signal and the reception signal sense circuit receives the transmission channel data signal and detects the reception signal from the satellite repeater via the reception channel corresponding to the transmission channel data signal.

According to another aspect of the transmission control apparatus, the transmission channel data signal may be transmitted by an order wire channel.

According to the present invention, there is also provided a transmission control method of a earth station for satellite communication in a satellite communication system using a plurality of earth stations for satellite communication, a transmission channel shared between the plural earth stations, and a satellite repeater in which transmission signals are communicated between the respective earth stations via the satellite repeater. The method comprises the steps of stopping at detection of a reception signal via a reception channel corresponding to a transmission channel of each of the earth stations prior to transmission of the transmission signal from the own station, the transmission of the transmission signal and continuing the transmission of the transmission signal, even when the reception signal is detected during the transmission of the transmission signal from the own station, until a predetermined transmission of the transmission signal is completed.

According to another aspect of the transmission control method, the method may further comprises the steps of producing a reception sense signal in response to sensing the reception signal via the reception channel, transmitting, if the reception sense signal has not been received before a transmission ON control signal indicating transmission of the transmission signal from the own station is received, a transmission ON signal indicating transmission of the transmission signal, continuing the transmission of the transmission ON signal until a transmission OFF control signal is received and activating the transmission of the transmission signal only when the transmission ON signal is being received.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, description will be given of an embodiment of the transmission control method in accordance with the present invention.

Figure 1:
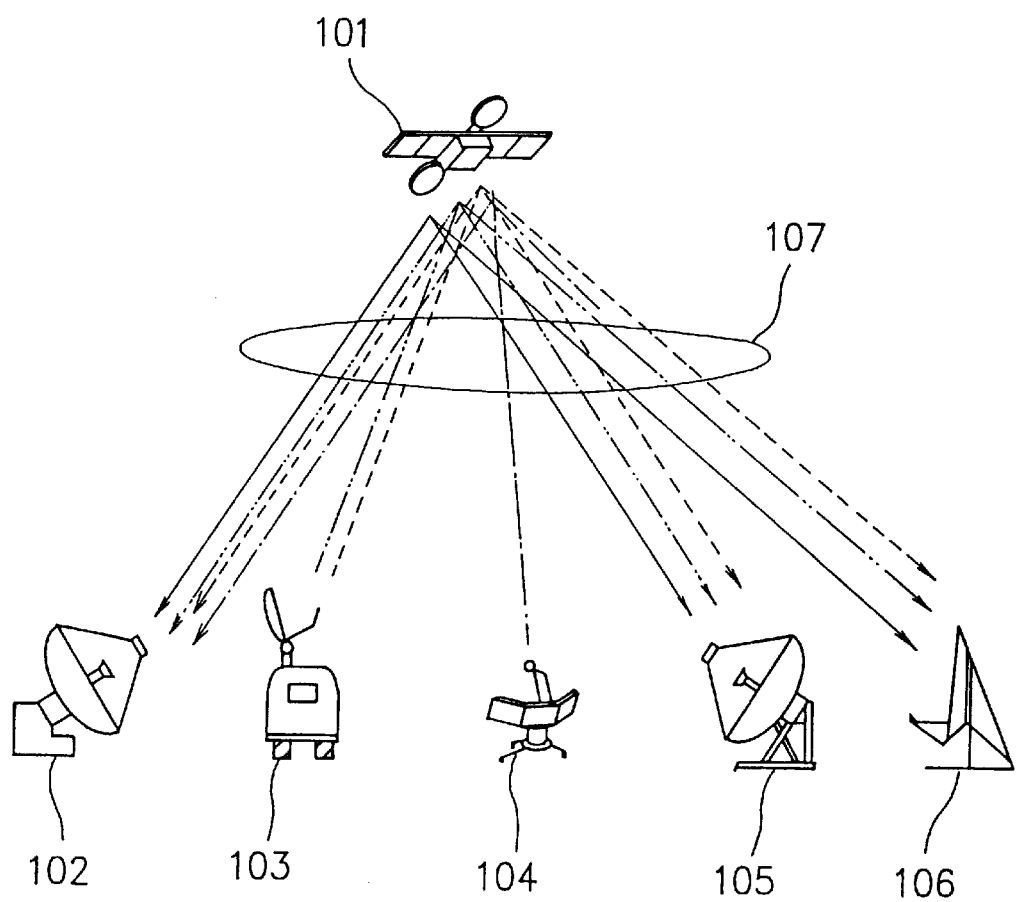
FIG. 1 is a schematic diagram showing the configuration of a satellite communication system in accordance with the present invention.
Figure 2:
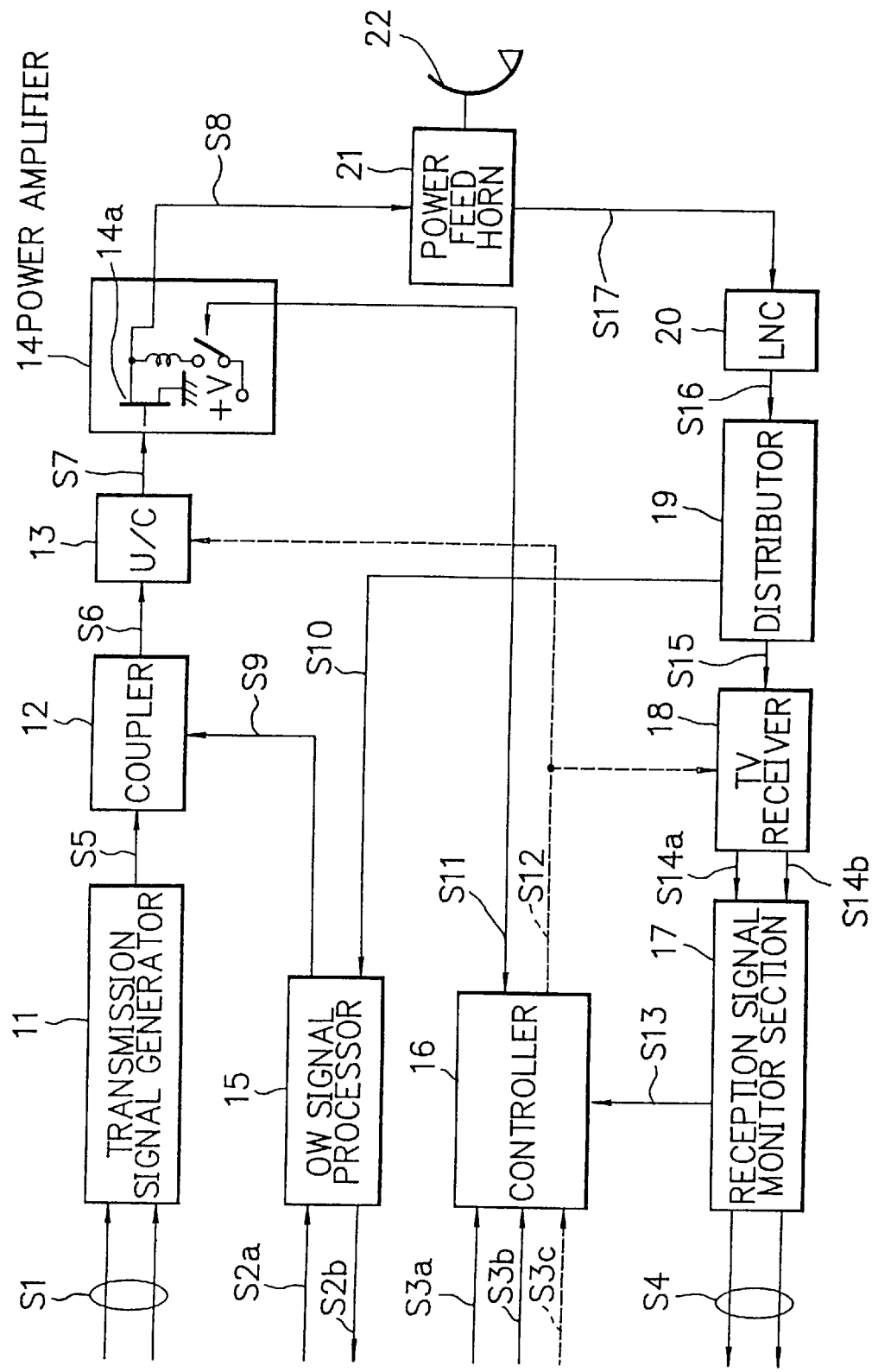
FIG. 2 is a block diagram showing an embodiment of the present invention.

FIG. 2 shows in a block diagram a transmission and reception section of the vehicle station 103 in the satellite communication system of FIG. 1.

In the system of FIG. 2, the transmission and reception section receives signals from terminal devices, not shown, communicating therewith. Specifically, a data signal S1 such as a signal of news images is received by a transmission signal generator 11, an OW signal for transmission is accepted by an OW signal processor 15, and a transmission ON control signal S3a and a transmission OFF control signal S3b, which will be described in detail later, are received by a controller 16. Additionally, the transmission and reception section transmits an OW signal S2b from the OW signal processor 15 and a monitor signal S4 from a reception signal monitor section 17 to the respective terminal facilities. Furthermore, the transmission and reception section transmits a transmission signal S8 from an antenna 22 to the communication satellite 101 shown in FIG. 1 and receives by the antenna 22 a reception signal S17 from the communication satellite 101.

The transmission signal generator 11 modulates a carrier signal according to the data signal S1 to resultantly create a data modulation signal S5. The OW signal processor 15 modulates the OW signal S2a to produce an OW modulation signal. The data data and OW modulation signals S5 and S9 are mixed with each other by a coupler 12 into an intermediate frequency signal S6. Receiving the signal S6, an up converter (U/C) 13 conducts a frequency conversion for the signal S6 to thereby generate a transmission signal S7 related to a transmission channel assigned to the vehicle station 103. Receiving the signal S7, a power amplifier 14 in a final stage of the vehicle station 103 carries out a power amplifying operation for the signal S7 to produce a transmission signal S8. In this connection, the power amplifier 14 is active to produce the signal S8 only when a transmission ON/OFF signal S11 indicating transmission of the signal S8 is being received from the controller 16. The operation to activate the amplifier 14 is accomplished by supplying power to an amplifier element 14a, for example, a field-effect transistor (FET) of the amplifier 14. The transmission signal S8 is passed through a power feed horn 21 and an antenna 22, which form a discriminator for signal transmission and reception, and is resultantly sent to the communication satellite 101.

On the other hand, a signal which corresponds to a transmission signal from another earth station, e.g., the portable station 104 shown in FIG. 1 and which also corresponds to the order wire signal is transmitted from the satellite 101 to the vehicle station 103. The reception signal is delivered via the antenna 22 and feed horn 21 to be supplied as a reception signal S17 to a low-noise converter (LNC) 20. The LNC 20 generally includes an amplifier to amplify the reception signal S17 to obtain an amplified signal with a reduced noise component and a down converter for converting the amplified signal S17 with respect to its frequency, thereby producing an intermediate-frequency signal S16. The signal S16 is separated by a distributor 19 into an OW intermediate-frequency signal S10 and a data intermediate-frequency signal S15. The signal S10 is then demodulated by the OW signal processor 15 into an OW signal S2b.

Furthermore, the data intermediate-frequency signal S15 is delivered to a TV receiver 18, which receives TV video and voice signals tuned to a reception channel corresponding to the transmission channel of the vehicle station 103. When the signal S15 has a frequency associated with the reception channel, the TV receiver 18 demodulates the TV video and voice signals obtained from the signal S15 and then sends the demodulated signal S14a and a reception level signal S14b of the signal S15 to a reception signal monitor section 17. In this regard, for the reception level signal S14b, there may be used an AGC voltage of the TV receiver 18. Alternatively, when the signal S15 is a TV video signal, it may also be possible to demodulate the TV video signal to attain, for example, a video synchronizing signal so as to utilize the demodulated signal as the reception level signal S14b. If the level indicated by the signal S14b from the TV receiver 18 has a magnitude enough to indicate that a reception signal has already been received by the reception channel, the reception signal monitor section 17 transmits a reception sense signal S13 to the controller 16. Moreover, the monitor section 17 supplies the terminal equipment with a monitor signal S4 for the video and voice signal monitor operations.

Figure 3:
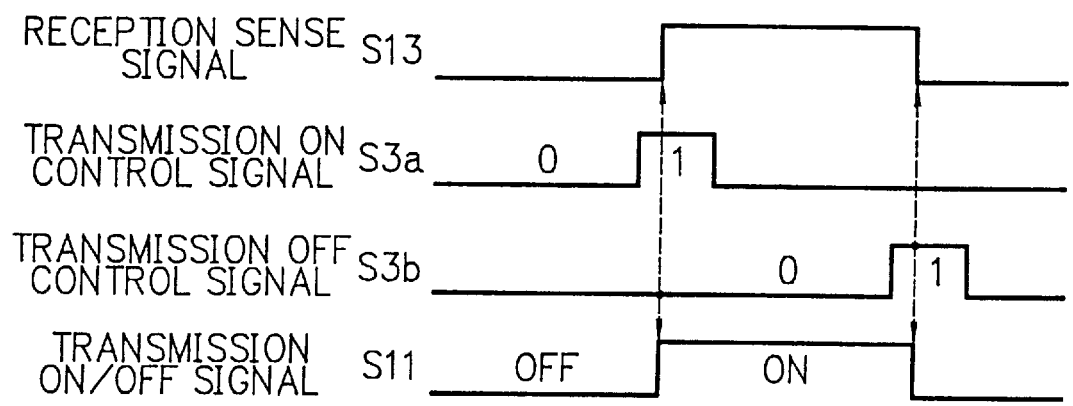
FIG. 3 is a signal timing chart of important signals related to the transmission control operation in the embodiment of the present invention.

FIG. 3 is a signal timing chart of signals primarily related to the transmission control operation in the embodiment. Referring next to FIGS. 2 and 3, description will be given of the control operation in the transmission of the signal 8 in accordance with this embodiment.

In the transmission and reception section of the vehicle station 103, the transmission channel is predetermined for the signal 8 by adjusting the frequency of the local oscillation signal of the up converter 13. In response thereto, the channel of the TV receiver 18 is assigned so that the reception signal 17 is received via the reception channel corresponding to the transmission channel. When the transmission signal S8 is to be sent from the vehicle station 103, the terminal equipment sends the data signal S1 and the transmission ON control signal S3a ("1") respectively to the transmission signal generator 11 and the controller 16. In this situation, when the reception sense signal S13 ("1") is being fed to the controller 16, the controller 16 does not transmit the transmission ON/OFF signal S11 (namely, retains the state of "0" of the transmission ON/OFF signal S11). Therefore, the power amplifier 14 is not activated and hence the transmission signal S8 is not produced.

When the reception sense signal S13 is not being supplied to the controller 16 at reception of the transmission ON control signal S3a, the controller 16 transmits the transmission ON/OFF signal S11 (changes the value thereof from "0" to "1"). Consequently, the power amplifier 14 is set to an active state and the transmission signal S8 is sent from the antenna 22. The transmission state of the transmission ON/OFF signal S11 (set to "1") continues until the controller 16 receives the transmission OFF control signal S3b from the terminal unit. During this period of time, the power amplifier 14 continuously sends the transmission signal S8. When the predetermined amount of data signals S1 is completely transmitted and the transmission OFF control signal S3b (set to "1") is received from the terminal equipment, the controller 16 sets the transmission ON/OFF signal S11 to level "0" to thereby terminate the transmission of the transmission ON/OFF signal S11. As a result, the power amplifier 14 is deactivated and hence stops transmitting the transmission signal S8.

In this connection, the transmission state of the transmission ON/OFF signal S11 set to "1" is kept unchanged even when the controller 16 receives the reception sense signal S13 during the transmission. For example, when the transmission signal S8 is sent from the transmission and reception section, the reception section beginning at the low-noise converter 20 receives the reception signal S17 corresponding to the transmission signal S8 of the own station to resultantly send the reception sense signal S13 to the controller 16 (reference is to be made to FIG. 3). However, the controller 16 continuously sends the the transmission ON/OFF signal S11 also in this case.

In the operation above, the transmission ON control signal S3a need not be necessarily the momentary signal shown in FIG. 3 but may be a successive signal which continues until the transmission OFF control signal S3b is supplied. On this occasion, the transmission ON control signal S3a serves also as the transmission OFF control signal S3b. Additionally, when it is difficult to retain the transmission ON/OFF signal S11 at level "1" by the successive signal, it is only necessary that the controller 16 latches the activation control status according to the transmission of the transmission ON/OFF signal S11 and inhibits the output of the reception sense signal S13 until the transmission OFF control signal S3b is received. Thereafter, on receiving the transmission OFF control signal S3b, the controller 16 achieves a control operation to initialize the power amplifier 14 and the output supply of the reception sense signal S13. The transmission ON/OFF signal S11 can be easily generated by such known logic circuits as an OR circuit, an AND circuit, and a flip-flop circuit.

As described above, in the transmission control method of the earth station for satellite communication in the embodiment in accordance with the present invention, when the reception signal S17 is sensed via a reception channel corresponding to the transmission channel of the station, there is automatically conducted operations as follows. Namely, the transmission of the transmission signal S8 is stopped, and even when the reception signal S17 is sensed during the transmission of the transmission signal S8 from the station, the transmission signal S8 is continuously sent until a predetermined amount of signals S8 is transmitted. In consequence, in a satellite communication system in which a plurality of earth stations share the same communication satellite 101 and the same transmission channel, an even of simultaneous emission of transmission signals from the plural earth stations, which possibly leads to radio interferences, can be avoided. Particularly, in the satellite news gathering system and the like, it is possible to substantially avoid the human operation errors in the transmission control operation of the transmission signals. Furthermore, thanks to the simple system configuration, the installation cost can be advantageously lowered.

The vehicle station 103 of the embodiment is efficient when the transmission channel is almost fixedly assigned. Referring again to FIG. 2, description will be given of an embodiment of the present invention suitable for a case in which a plurality of transmission channels can be variously selected in response to an indication of the OW signal S2b or the like from the video base station 102.

Receiving the OW signal S2b indicating a transmission channel number from the station 102, the operator of the vehicle station 103 supplies from the terminal equipment a transmission channel data signal S3c obtained by digitalizing the transmission channel number to the controller 16. The controller 16 then converts the signal S3c into a frequency control signal S12 in an analog form and then feeds the signal S12 to the up converter 13 and TV receiver 18. In response thereto, the converter 13 generates a local oscillation signal for transmission having a frequency associated with the frequency control signal S12. According to the oscillation signal, the up converter 13 generates from the intermediate frequency signal S6 a transmission signal S7 for a transmission channel associated with the transmission channel number. In addition, the TV receiver 18 produces a local oscillation signal for reception having a frequency corresponding to the control signal S12. Using the oscillation signal, the TV receiver 18 generates from the data intermediate frequency signal a demodulation signal S14a and a reception level signal S14b associated with the reception channel corresponding to the transmission channel.

As above, in the vehicle station 103 of the embodiment, the reception channel is automatically changed in association with any alteration of the transmission channel. Consequently, there is advantageously obtained an effect, in addition to the advantageous feature of the embodiment above, that the reception channel can be correctly set in association with the transmission channel.

Incidentally, although description has been primarily given of the vehicle station 103 in the embodiment of FIG. 1, it is to be appreciated that the present invention is also applicable to the other earth stations of the present satellite communication system excepting the reception dedicated station.

In accordance with the present invention as described above, each of the earth stations achieving satellite communications includes transmission control means in which when a reception signal is sensed via a reception channel corresponding to the transmission channel of the own station prior to the transmission of a transmission signal from the own station, the transmission of the transmission signal is interrupted such that even when the reception signal is sensed during the transmission of the transmission signal of the own station, the transmission signal is continuously transmitted until a predetermined transmission of the transmission signal is completely finished. In consequence, there is obtained an advantage that the simultaneous emission of transmission signals from the plural earth stations can be prevented and hence radio interferences are avoided.

In particular, when the present invention is applied to the satellite news gathering system and the like, it is possible to substantially suppress the human operation errors in the transmission control operation of transmission signals. Additionally, since the system is configured in a simple structure, the system installation cost can be advantageously minimized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A transmission control apparatus of an earth station for satellite communication in a satellite communication system comprising:

a plurality of earth stations for satellite communication:

a transmission channel shared between the plural earth stations; and a satellite repeater in which transmission signals are communicated between the respective earth stations via the satellite repeater;

at least one of the earth stations including transmission control means for stopping an initiation of a transmission of a transmission signal by the at least one earth station upon detection of a reception signal via a reception channel corresponding to a transmission channel of the at least one earth station, and if the reception signal is detected during the transmission of the transmission signal from the at least one earth station, continuing the transmission of the transmission signal until a predetermined transmission of the transmission signal is completed, wherein the transmission control means includes:

a reception signal sense circuit for sensing the reception signal via the reception channel and producing a reception sense signal in response thereto;

a transmission controller for transmitting a transmission ON signal if the reception sense signal has not been received before reception of a transmission ON control signal indicating transmission of the transmission signal from the at least one earth station, the transmission ON signal indicating transmission of the transmission signal, the transmission controller continuing the transmission of the transmission ON signal until a transmission OFF control signal is received; and a transmission signal ON/OFF circuit for activating the transmission of the transmission signal only when the transmission ON signal is being received.

2. A transmission control apparatus in accordance with claim 1, wherein the transmission ON/OFF circuit includes an amplifier at a final stage thereof for amplifying the transmission signal, the amplifier being supplied with power only when the transmission ON signal is being received.

3. A transmission control apparatus in accordance with claim 1, wherein:

there are a plurality of transmission channels, the transmission control means further includes transmission channel control means for receiving a transmission channel data signal and thereby controlling the transmission channel of the transmission signal; and the reception signal sense circuit receives the transmission channel data signal and detects the reception signal from the satellite repeater via the reception channel corresponding to the transmission channel data signal.

4. A transmission control apparatus in accordance with claim 3, wherein:

said transmission channel data signal is transmitted by an order wire channel.

5. A transmission control method of an earth station for satellite communication in a satellite communication system using a plurality of earth stations for satellite communication, a transmission channel shared between the plural earth stations, and a satellite repeater in which transmission signals are communicated between the respective earth stations via the satellite repeater, the method comprising the steps of:

stopping an initiation of a transmission of a transmission signal by the earth station upon detection of a reception signal via a reception channel corresponding to the transmission channel;

continuing the transmission of the transmission signal, even when the reception signal is detected during the transmission of the transmission signal until a predetermined transmission of the transmission signal is completed;

producing a reception sense signal in response to the detection of the reception signal via the reception channel;

transmitting a transmission ON signal if the reception sense signal has not been received before a transmission ON control signal indicating transmission of the transmission signal from the earth station is received, the transmission ON signal indicating transmission of the transmission signal;

continuing the transmission of the transmission ON signal until a transmission OFF control signal is received; and activating the transmission of the transmission signal only when the transmission ON signal is being received.

* * * * *